March 15, 1960 — C. S. PRENDERGAST — 2,928,350
VANE DISPLACEMENT PUMPS OR MOTORS
Filed Jan. 22, 1958 — 2 Sheets-Sheet 1

Inventor
CHARLES SCOTT PRENDERGAST,
By John B. Brady
Attorney

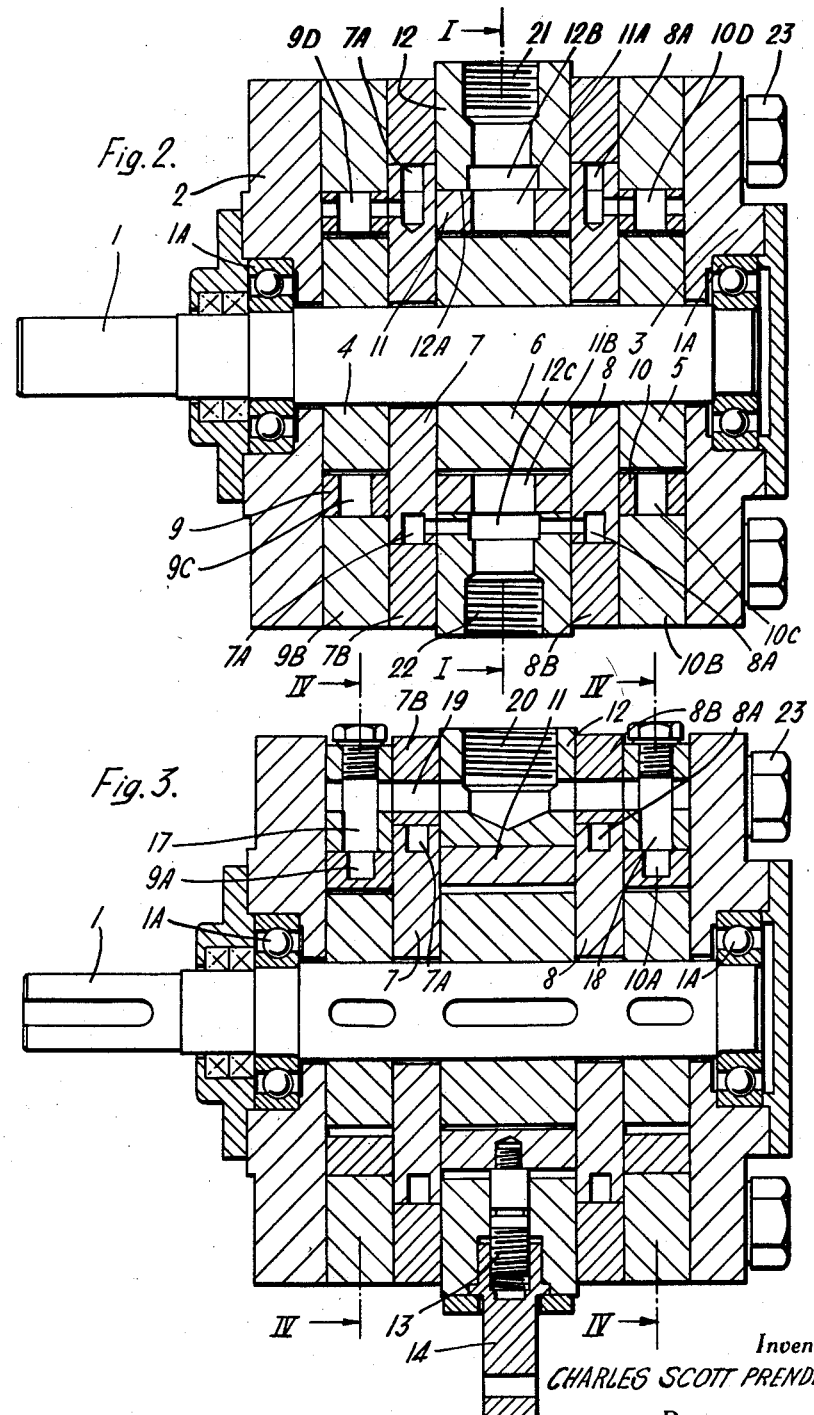

United States Patent Office 2,928,350
Patented Mar. 15, 1960

2,928,350

VANE DISPLACEMENT PUMPS OR MOTORS

Charles Scott Prendergast, Shoreham by Sea, England
Application January 22, 1958, Serial No. 710,574

Claims priority, application Great Britain
August 2, 1957

2 Claims. (Cl. 103—4)

This invention relates to that type of pump or motor in which at least one circular rotor carrying a plurality of slidable vanes rotates inside the bore of a stator element, which bore may be circular in shape and eccentrically disposed in relation to the rotor or, alternatively, may be of oval or other suitable shape.

It is known to cut in the side members of such a pump or motor, channels that connect with the bottoms of the grooves in the rotor in which the vanes are accommodated for sliding movement, thereby to provide for pressure sealing on the pressure side and for filling the spaces at the bottoms of the grooves on the non-pressure or suction side. It is also known that such channels provide leak paths that greatly reduce the efficiency of the pump or motor.

The present invention provides an improved construction in which provision is made for maintaining effective sealing contact between the slidable vanes and the stator bore.

A pump or motor embodying the invention may have one or more rotors and a corresponding number of stators as aforesaid and may be constructed for constant or variable displacement.

In a conventional pump or motor of the stated type the or each rotor has a plurality of radial grooves extending inwardly from the periphery in which the vanes are slidable and equally angularly spaced from one another.

As distinct from this the present invention provides a rotary pump or motor comprising at least one stator having a bore, inlet and outlet connections in communication with said stator bore and separated from one another by unbroken circumferential portions of said stator bore; a rotor mounted for rotation within said stator bore, said rotor having a plurality of equally angularly spaced pairs of straight-sided peripheral grooves the grooves of each pair diverging inwardly from the rotor periphery and being located closely adjacent to one another relative to the angular spacing of the pairs of grooves, said last recited spacing being less than the angular length of each unbroken circumferential portion of said stator bore, and a plurality of pairs of flat vanes slidable one vane in each of said grooves thereby forming between adjacent pairs of said vanes, chambers acting alternately as pressure and non-pressure chambers as the rotor rotates; said rotor also having a separate duct for each groove connecting the bottom thereof with the rotor periphery between the vane in said groove and the vane in the nearest groove of the adjacent pair of grooves, whereby on rotation of said rotor one vane at a time of each pair of vanes makes sealing contact with said stator bore by fluid pressure while traversing the unbroken circumferential portions of said bore.

This construction ensures that when the rotor rotates, one of each pair of the vanes that separate the pressure chambers from the non-pressure chambers is held in sealing contact with the stator bore; and it also ensures the filling of the spaces at the bottoms of the grooves behind the vanes with fluid as the vanes move outwards on the non-pressure side of the rotor. This eliminates the necessity for the aforesaid channels in the side members of the pump or motor and their attendant leak paths.

The invention will be fully understood from the foregoing together with the further description that follows, and the accompanying drawings whereon, by way of example, one construction form of the rotor is applied to a pump having features protected by our co-pending application No. 710,573.

Fig. 1 of the drawings represents a cross section of the pump on the line I—I of Fig. 2.

Fig. 2 represents a longitudinal section on the line II—II of Fig. 1.

Fig. 3 represents a longitudinal section on the line III—III of Fig. 1.

Figure 1:
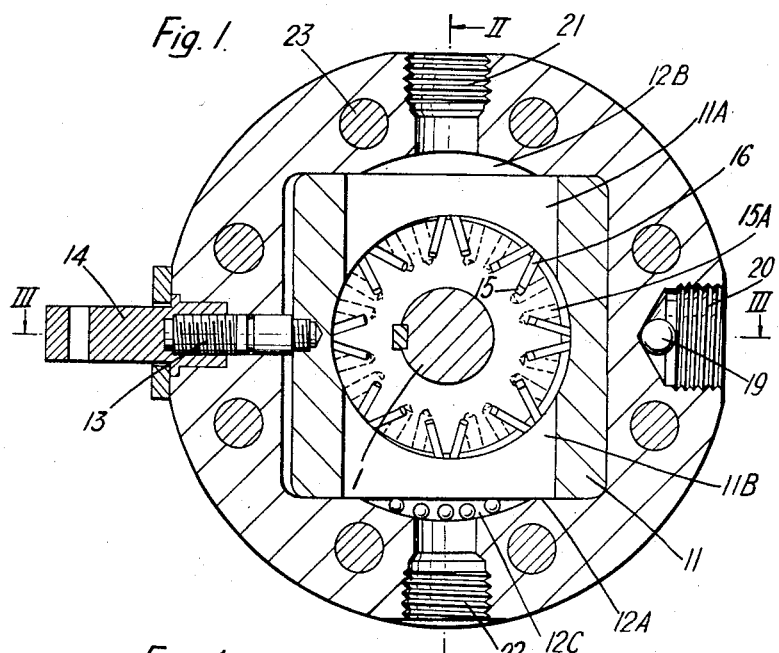
Figure 4:
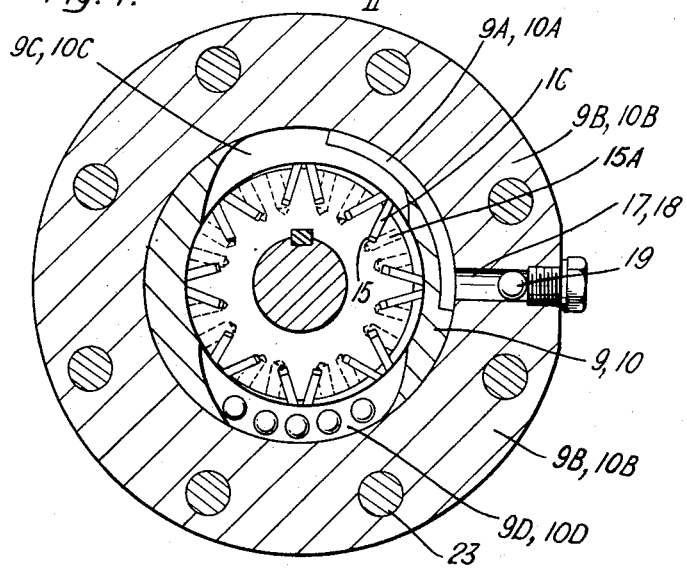
Fig. 4 represents a cross section in either of the planes IV—IV of Fig. 3.

As illustrated, a driving shaft 1 is carried in ball-bearings 1A housed in end members 2 and 3. Keyed to the driving shaft, concentrically in relation to its axis, are three circular rotors 4, 5 and 6 the rotor 6 being equal in width to the other two. The rotors 4 and 5 are adjacent to the end members 2 and 3 respectively and are separated from the intermediate rotor 6 by two partitioning members 7 and 8. The partitioning members 7 and 8 have annular grooves 7A and 8A formed around their peripheries and fit inside surrounding members 7B and 8B of the same axial width as said partitioning members, so that the annular grooves 7A and 8A are completely enclosed. The rotors 4 and 5 are contained in the circular bores of stator members 9 and 10, and the bores of these stator members have equal and fixed eccentricities in relation to the axis of the driving shaft 1. The stator members 9 and 10 have partly annular grooves 9A and 10A, Figs. 3 and 4, formed around their peripheries over an angular distance of about 90° and fit inside surrounding members 9B and 10B of the same axial width as said stator members, so that the partly annular grooves 9A and 10A are completely enclosed. The intermediate rotor 6 is contained in the circular bore of a stator member 11 which itself is slidably mounted in slides 12A formed in a surrounding member 12. The position of the stator member 11 can be adjusted in the slides 12A by an adjusting screw 13 and nut 14. By means of this adjustment the stator 11 can be moved in relation to the axis of the driving shaft 1 so as to bring the bore of the stator 6 to any position between one of maximum eccentricity in one direction and one of maximum eccentricity in the opposite direction in relation to said axis. The diameters of the bores of all the stator members 9, 10 and 11 are sufficiently greater than the outside diameters of the rotors 4, 5 and 6 to afford eccentricity.

All the stationary members 2, 9, 9B, 7, 7B, 12, 8, 8B, 10, 10B and 3 are secured rigidly together by bolts 23.

In each of the rotors are formed eight equidistantly spaced pairs of straight-sided grooves 15, the grooves of each pair diverging inwardly from the rotor periphery and being located closely adjacent to one another relative to the angular spacing of the pairs of grooves, which angular spacing is less than the angular length of each unbroken circumferential portion of the stator bore. Sixteen, or a multiple of sixteen, radial ducts 15A connect the bottoms of all the grooves 15 of the rotor periphery between adjacent pairs of said grooves. Slidably mounted in each groove 15 there is a vane 16 the outer end of which is shaped to conform approximately with the shape of the periphery of the bore of the pertaining stator. When the shaft 1 is rotated the vanes in the rotors 4, 5 and 6 are brought into contact with the peripheries of the bores of the surrounding stators 9, 10 and 11 by centrifugal force. The vanes 16 of each rotor form with the periphery of the rotor and the bore of the corresponding stator and the side or partitioning members, eight enclosed arcuate chambers, and these chambers expand and contract in volume as the rotor is rotated.

The fixed stators 9 and 10 have arcuate grooves 9C, 9D, 10C and 10D formed in the peripheries of their bores, the two grooves in each stator being diametrically opposite to one another. Each of the arcuate grooves 9C and 10C is connected to one extremity of each of the partly annular grooves 9A and 10A. The other extremities of the partly annular grooves 9A and 10A are connected by radial holes 17 and 18 in the surrounding members 9B and 10B to an axial hole 19 which passes through the members 7B and 8B and the member 12 surrounding the intermediate stator 11. A screw-threaded inlet port 20 formed in the member 12 connects to the axial hole 19. When the shaft 1 is rotated, the expanding chambers of the rotors 4 and 5 are filled with fluid fed from the inlet port 20 into the arcuate grooves 9C and 10C. The contracting chambers connect with the arcuate grooves 9D and 10D. The adjustable stator 11 has two enclosed radial grooves 11A and 11B which pass through it and connect to two further arcuate grooves 12B and 12C in the slide 12A of the surrounding member 12. The area of the mouth of each of the grooves 12B and 12C is slightly less than the projected area of half the periphery of the bore of the stator 11, thus ensuring that the slide forms a seal by means of fluid pressure. The grooves 11A and 11B are on the same diametral centre line as the grooves 9C and 9D and the grooves 10C and 10D, but the grooves 11A and 11B are at 180° to the grooves 9C and 10D and the grooves 11B and 12C are at 180° to the grooves 9D and 10D. Radial screw-threaded ports 21 and 22 formed in the member 12 connect respectively with the grooves 12B and 12C. Grooves 9D and 10D are connected respectively to the enclosed annuli 7A and 8A formed in the partitioning members 7 and 8. The annuli 7A and 8A are also connected to the groove 12C. When the shaft is rotated the fluid displaced by the contracting chambers of the rotors 4 and 5 passes through the grooves 9D and 10D around the annuli 7A and 8A into the radial groove 12C and thence through the outlet port 22.

When the relative eccentricity of the stator 11 and the rotor 6 is opposed to the relative eccentricity of the stators 9 and 10 and the rotors 4 and 5, fluid is fed in through the port 21 to the expanding chambers of the rotor 6, and the fluid displaced by the contracting chambers of said rotor 6 is added to that displaced by the contracting chambers of the rotors 4 and 5, the total flow passing out through the outlet port 22.

When there is no relative eccentricity between the stator 11 and the rotor 6, no displacement takes place between them and under this condition the total displacement of the pump is that obtained from the displacement chambers of only the rotors 4 and 5.

When the relative eccentricity of the stator 11 and the rotor 6 is in the same direction as the relative eccentricity of the stators 9 and 10 and the rotors 4 and 5, the displacement chambers of the rotor 6 absorb part or all the displacement of the rotors 4 and 5 according to the degrees of eccentricity, the fluid absorbed returning to supply through the port 21.

The grooves 9C and 9D in the stator 9, the grooves 10C and 10D in the stator 10, and the grooves 11A and 11B in the stator 11 are separated from one another at each end by an angular distance slightly greater than the angular distance between any two adjacent pairs of vanes 16 in the rotors 4, 5 and 6. By reason of the radial holes 15A that connect the bottoms of the radial grooves 15 with the peripheries of the rotors 4, 5 and 6, between adjacent pairs of vanes 16, at least two vanes are always kept in contact with the bore of each stator by fluid pressure between the expanding and contracting chambers, thus providing continuous and effective seals between the expanding and contracting chambers. The rotor is so mounted within the stator that radial holes 15A at opposite sides of the rotor are always subject to pressure, the pressure moving from the groove 9D into a radial hole 15A at the right in Fig. 4 for projecting one of the vanes 16 into sealing contact with the stator while at the same time one of the vanes of the group of vanes 16 in the opposite side of the rotor is projected by pressure acting through a radial hole 15A at the left of the rotor in Fig. 4 for projecting the associated vane 16 into sealing relation with the stator.

The radial ducts 15A also provide means for filling the spaces at the bottoms of the grooves 15 with fluid as the vanes 16 move outwards and for displacing this fluid as the vanes move inwards. This provides a smooth reciprocation of the vanes and adds to the fluid displacement caused by the sweeping action of the vanes, the piston displacement caused by the reciprocating movements of the vanes.

I wish it to be understood that the invention is not restricted to a pump as herein described since rotors constructed in accordance with the invention may be incorporated in various pumps or motors of the type first set forth herein.

I claim:

1. A rotary pump or motor comprising at least one stator having a bore; inlet and outlet connections in communication with said stator bore and separated from one another by two unbroken circumferential portions of said stator bore; a rotor mounted for rotation within said stator bore, said rotor having a plurality of equally angularly spaced pairs of straight-sided peripheral grooves, the grooves of each pair diverging inwardly from the rotor periphery and being located closely adjacent to one another relative to the angular spacing of the pairs of grooves, said last recited spacing being less than the angular length of each unbroken circumferential portion of said stator bore; and a plurality of pairs of flat vanes slidable one vane in each of said grooves thereby forming between adjacent pairs of said vanes chambers acting alternately as pressure and non-pressure chambers as the rotor rotates; said rotor also having a separate duct for each groove connecting the bottom thereof with the rotor periphery between the vane in said groove and the vane in the nearest groove of the adjacent pair of grooves, whereby on rotation of said rotor, at least two vanes at a time, of which at least one is of a pair of two diametrically opposite pairs of vanes, make sealing contact at all times with said stator bore by fluid pressure thrusting said vanes outwardly into sealing relation with the inner surface of the stator bore while traversing the unbroken circumferential portions of said bore.

2. A rotary pump or motor as set forth in claim 1, including a rotatably mounted shaft having a plurality of rotors thereon, a similar number of circularly bored stators surrounding the rotors and mounted eccentrically in relation to the axis of the rotor shaft, said rotors having peripheral grooves therein, vanes slidable in said peripheral grooves in the rotors thereby forming displacement chambers between the rotors and the stator bore, inlet and outlet connections communicating with each of the stator bores, means for interconnecting said inlet connections, means for interconnecting said outlet connections, a member affording a slide for one only of the stators, and means for displacing the slide-borne stator at will between a position on one side of the rotor shaft axis and a position an equal distance on the opposite side of said axis thereby to vary the eccentricity of the bore of the slide-borne stator.

(References on following page)

References Cited in the file of this patent

UNITED STATES PATENTS

| | | |
|---|---|---|
| 706,158 | Charles | Aug. 5, 1902 |
| 1,820,009 | Blackmer | Aug. 25, 1931 |
| 1,943,929 | Rayburn | Jan. 16, 1934 |
| 1,988,213 | Ott | Jan. 15, 1935 |
| 2,062,310 | Hittell | Dec. 1, 1936 |
| 2,368,789 | Tucker | Feb. 6, 1945 |
| 2,513,446 | Brown | July 4, 1950 |
| 2,541,197 | Breedlove | Feb. 13, 1951 |
| 2,691,482 | Ungar | Oct. 12, 1954 |
| 2,764,941 | Miller et al. | Oct. 2, 1956 |
| 2,804,016 | Moore | Aug. 27, 1957 |

FOREIGN PATENTS

| | | |
|---|---|---|
| 19,987 | Great Britain | of 1901 |
| 162,128 | Australia | Mar. 23, 1955 |